Patented Aug. 22, 1933

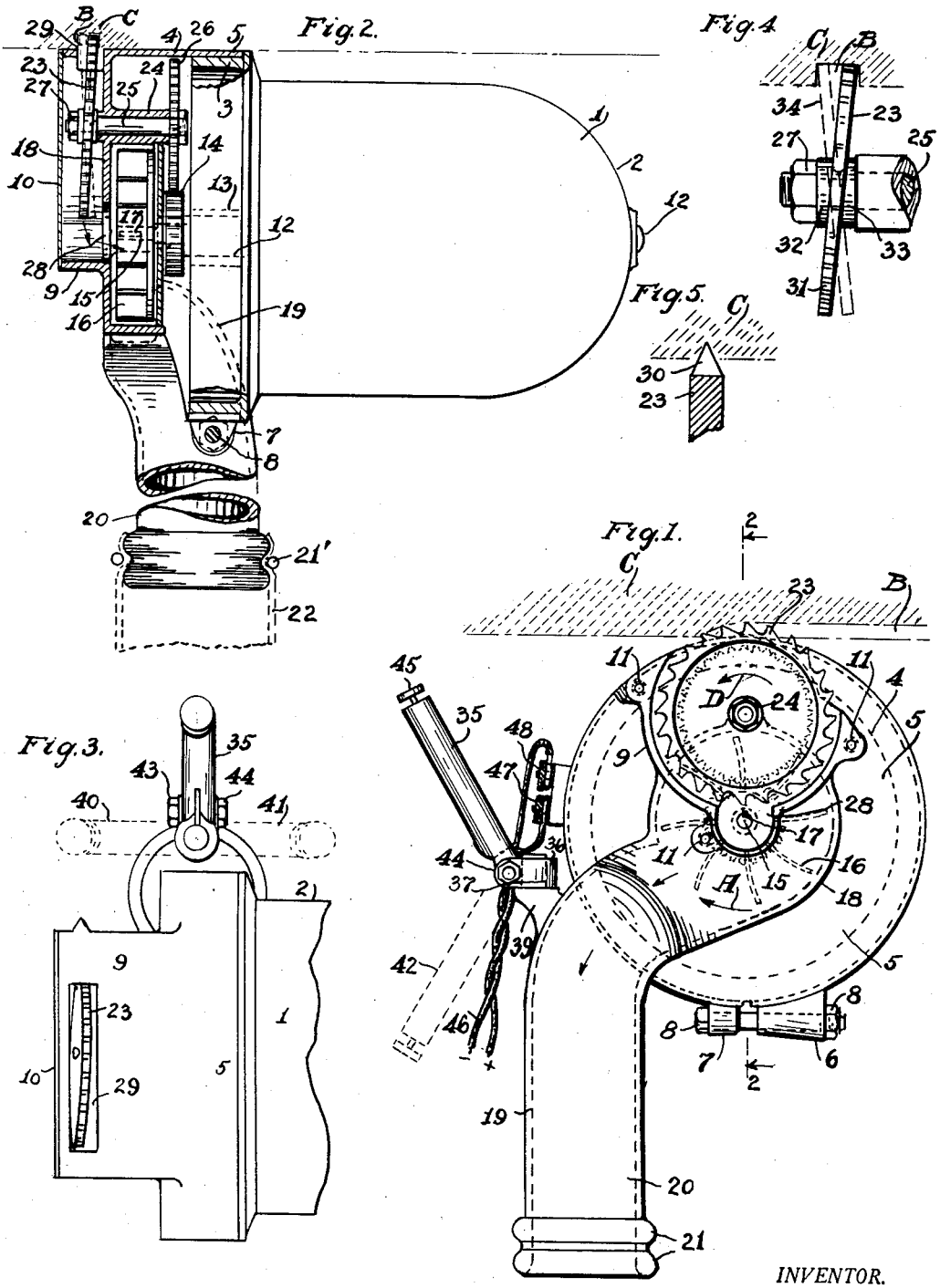

1,923,159

UNITED STATES PATENT OFFICE 1,923,159

WALL-CRACK CUTTING ROUTER

Daniel F. McLaren, Glen Cove, N. Y.

Application August 7, 1929. Serial No. 384,070

13 Claims. (Cl. 72—138)

My present invention relates to a device for cutting out or routing cracks in plaster walls, and has for its principal object the provision of a controlled, automatic means whereby to eliminate laborious hand cutting upon plaster walls, which are to be repaired.

As is well known, old plaster walls become filled with cracks due to settling of buildings, shrinkage of plaster et cetera, and when it is desired to paint or paper the same it is necessary to rake or cut out the plaster from both sides of the cracks by a suitable hand tool; thereafter the cut-out cracks are moistened, filled and replastered to a smooth finish. Then the pointed cracks may be shellacked, primed, papered or painted, as desired, leaving the wall unbroken, smooth and free of cracks.

One of the objects of my improvement is to provide a crack cutting or routing device wherein a special form of cutter is motorized to provide for easy and rapid removal of the material from the cracks, for replastering.

Another object of my improvement is to provide means in conjunction therewith whereby to remove plaster and cutting debris, during the cutting operation, and deposit the same in a suitable receptacle so that the work of crack-cutting may be done in a rapid, efficient and clean manner, without leaving any residue or dust, thereby obviating the necessity of room cleaning, after the crack-cutting operation has been completed.

Another object of my improvement is to provide a means of the character described which is light in weight, easily handled, with convenient starting means, rapid in operation, and which, as a tool of the kind described, will be economical to manufacture and therefore low in cost.

These and other capabilities will be apprehended as the herein description proceeds, and it is obvious that modifications may be made in the herein structure without departing from the spirit thereof or the scope of the appended claims.

In the drawing:

Fig. 1 is an end elevation of my device with the cutter cap plate removed.

Fig. 2 is partly a side elevation thereof and partly a section, taken on the line 2—2, Fig. 1, looking in the direction of the arrows.

Fig. 3 is a fragmentary plan view taken from the top of Fig. 2, looking downward, principally showing the universal adjustability of the handle portion.

Fig. 4 is an enlarged fragmentary view of parts of my device showing one form of cutter therein and the type of groove cut in the wall thereby.

Fig. 5 is a fragmentary view showing a different form of cutter.

My device is fully shown in Figs. 1 and 2, and it comprises essentially, as in Fig. 2, an electric motor 1 which is enclosed in a housing 2, the housing being provided at its forward end with a cylindrical open ended flange portion 3 shown partially in section in Fig. 2. Upon said cylindrical flange 3 is removably mounted a gear and suction blower casing 4, the same being of a contour whereby it has an enlarged open cylindrical end 5, the lower end of which is split and has two bosses 6 and 7 thereon, as in Fig. 1, and being joined together by a bolt and nut 8, whereby the open end of the casing 5 may be clampably associated to the cylindrical extension 3 of the motor. This provides removable means for assembly and disassembly of the geared lower casing 4 for repair and interior inspection, when desired.

The casing 4 is provided with a plurality of bearings for mounting the requisite gear train and blower fan means, as will hereinafter be described. It is also provided, at its front or outer end, with a reduced cylindrical portion 9 upon which is affixed a cover or cap plate 10 and, as indicated in Fig. 1, the cylindrical portion 9 is provided with three lugs 11 which are bored and tapped to receive cap screws which engage corresponding ears upon the cap 10 to lock said cap upon the cylindrical extension 9.

The motor shaft 12, at its forward end, is mounted in a bearing 13, Fig. 2, shown dotted, and which is suitably affixed to the interior surface of the cylindrical portion 3 of the casing and an extension of this shaft 12 has mounted thereupon, in keyed relation thereto, a pinion 14. A further extension of the shaft 12 extends forwardly in reduced diameter, as at 15, Fig. 2, and upon this reduced extension is keyed a rotatable blower fan 16 by a key 17, shown dotted in Fig. 2 and in full lines in Fig. 1.

In the interior of the casing 4 and integral therewith is an inner cylindrical portion 18 in the interior of which is located the said blower 16, and the exterior walls of which merge, as indicated in Fig. 1, with a completely enclosed duct 19 which merges with the cylindrical chamber 18 and extends downwardly, as in Fig. 1, into a cylindrical extension 20 having heads 21 thereon and which, as is indicated in Fig. 2, provide a seat for holding means in the form of a flexible wire ring 21' to engage thereto the neck of a suitable porous dust collecting bag or receptacle 22 which may be of fabric, paper or similar porous material, whereby to form, as will hereinafter be described in detail, a collecting bag for the debris that is dislodged by the action of the toothed, rotary cutter means and air carried into said bag by the action of the blower.

The outer wall of the blower chamber 18 merges with the outer cylindrical extension 9, thereby forming two distinct chambers, in one of which the blower 16 revolves and in the other of which the crank cutter 23 revolves.

At the top of the inner chamber 18 is arranged a bearing 24, best shown in Fig. 2, which in turn mounts a shaft 25 therein, upon one end of which is located a gear 26 which normally is at all times in driving mesh with the pinion 14. The outer end of the shaft 25 has mounted thereon a disk-like toothed crack cutter 23 having peripheral teeth and which is suitably affixed thereto by a nut 27 which is tightened upon the threaded end of the shaft 25 against collars, as shown, with the cutter member 23 therebetween, thereby to hold the cutter in rotative driving position.

Thus, as described, operation of the motor operates a reducing gear train and, in detail, the motor drives the pinion 14 and this in turn drives gear 26 and shaft 25 drives cutter 23, thus reducing the speed of the cutter and increasing its power for the purpose of crack routing.

Simultaneously with the operation of the above noted gear train and cutter, the motor 12 causes the blower 16 to operate in the direction of the arrow A, Fig. 1, thus creating a suction in the blower chamber which, in turn reacts to create a suction within the cutter chamber in the housing 9 and such suction causes air and other matter, such as dust and debris, which is removed from a wall, to be passed through the aperture 28 shown in the lower portion of the chamber 9 in the wall 18 between the cutter and blower, and thence to the porous collecting bag.

Due to the mounting of the cutter, as is indicated in Figs. 1 and 2, the upper end thereof projects a sufficient distance beyond the cutter opening 29 provided in the upper part of the chamber 9 in such a manner as to permit the teeth on the cutter 23 to project a crack cutting distance, indicated by B, Figs. 1 and 2, the dotted construction C indicating a fragment of a plaster wall which is being raked the desired distance into the skim coat of plaster upon the wall.

The cutter revolves in the direction of the arrow D, Fig. 1, and the inclined teeth of said cutter project into the plaster and crack, as directed by hand, to rake out the groove B, in any desired form and, in accordance with the cutter teeth contour or the arrangement of the cutter upon the shaft 25.

In some forms of cutters the cutter may be arranged upon the shaft or arbor 25 in strictly vertical alinement therewith and the cutter may have peripheral raking, angular teeth 30, as indicated in Fig. 5, whereupon the groove to be cut by such cutter will be of V-shape, as indicated by that portion of the cutter entering the plaster wall C, Fig. 5.

Conversely, the cutter 23, as in Figs. 2 and 4, may have the teeth of cutter width and substantially square ended, as at 31, Fig. 4, and the said cutter may be mounted upon the shaft 25 in a slightly angular relation by two angle collars 32 and 33, Fig. 4, whereby the circular square ended tooth cutter 23 may be slightly inclined relative to the axis of the shaft 25, and thereby cause the cutter to appear to wabble from side to side during rotative cutting action, as indicated in the full and dotted lines 34, Fig. 4, thereby creating a larger groove B, Fig. 4, due to the rotation of the rotary cutter 23 when so arranged. This is known as "wabble saw cutting" and may be used for eliminating cracks of considerable breadth whereas the cutter, as indicated in Fig. 5, may be utilized to rout out hair line cracks in the wall which do not require large removal of the material adjacent said lines.

As a means for operatively holding the device during operation thereof, a pivoted, circularly mounted handle 35 is provided, as shown in Figs. 1 and 3, and this handle is so pivoted to and mounted by a cylindrical clamping ring 36 upon the stem 37 integral with lug 39 which is integral with the tubular member 19, that the handle 35 may be either rotatably moved about the stem 36, as indicated by the positions 40, 41, shown dotted in Fig. 3, or it may be pivotally moved vertically relative thereto, or both, as indicated by the dotted position 42, Fig. 1, and clamped to desired adjusted position by a stud and clamp nuts 43, 44, Figs. 1 and 3, whereby said handle may be moved in any desired position relative to the implement itself and lockably clamped in such desired position for convenience in holding the implement and guiding the cutter to the work.

The handle may be also provided with a switch button 45 which is in switch-like connection with wiring 46, Fig. 1, which wiring in turn connects to the two terminals 47, 48 of the motor whereby the wiring being flexible will permit universal movement of the handle, as described, and the switch means 45 will be in proper position for manual operation to cause the motor to start and stop, as desired. It is understood that the wiring 46 is connected to a suitable source of electric current supply, preferably any household current tap, not shown.

Thus, it will be noted I have provided a power driven means for crack raking or routing which works rapidly and efficiently to cut any encountered crack in the wall, to rout in any desired width with a groove, either V-shaped or rectangular, as desired, and that I have also provided means whereby operation of the cutter member in plaster walls will operate simultaneously therewith a suction blower which will draw the loosened debris from the crack cutting position of the cutter through and down into a debris collecting bag 22 of porous nature, which passes the air therefrom and retains all of the dust and debris removed by the cutter.

It is obvious that this device will operate quickly, saving time, doing away with manually laborious cutting operations heretofore utilized, and collecting the dirt within the device, thereby preventing the littering of the room in which the work is being done and obviating the subsequent cleaning of the room.

The bag, after it has been filled, may be removed and emptied, and then again replaced upon the exhaust extension tube 20 for further reuse. The cutter 23 may be removed at any time and replaced by another by removal of the cap plate 10 and removal and replacement of any desired cutter, and the cap plate then again replaced.

It will also be noted that the cutter is so relatively arranged in the mounting that its upper and outer end is permitted to cut into the wall a reasonable depth and that the cutter will carry through its opening 29, the debris thus removed down to its lower position, at which point the lower cutter teeth pass by the air suction opening 28 and that the air suction induced by the blower 16 enters through the cutter opening 29 in the upper end of the housing 9 and thence passes downwardly, as previously described, to the bag 22.

Having thus described my invention, what I claim is:

1. A mechanical crack router comprising a motor, a crack cutter driven thereby, a suction air blower driven by said motor, and a means for connecting to the discharge end of the blower a porous collector for collecting the debris loosened by said cutter and impelled by said blower into said collector.

2. A mechanical crack router comprising an electrically driven motor, a crack cutter driven thereby, geared speed reducing means between the motor and the cutter, a suction fan driven by said motor, one or more casings surrounding the motor, cutter, speed reducing means and fan, and a debris conducting duct extending from said casings and having thereon a means for connecting thereto a removable debris collecting means.

3. A mechanical crack router comprising an electrically driven motor, a crack cutter driven thereby, geared speed reducing means between the motor and the cutter, a suction fan driven by said motor, one or more casings surrounding the motor, cutter, speed reducing means and fan, a debris conducting duct extending from said casings, and an adjustable handle connected to a part of said router.

4. A mechanical crack router comprising an electrically driven motor, a crack cutter driven thereby, geared speed reducing means between the motor and the cutter, a suction fan driven by said motor, one or more casings surrounding the motor, cutter, speed reducing means and fan, a debris conducting duct extending from said casings, an adjustable handle connected to a part of said router and a switch carried by said handle.

5. A mechanical crack router comprising a motor, a crack cutter driven thereby, and means for removing to a suitable collecting means the debris loosened by the cutter, said removing means comprising a casing, encompassing said cutter, a device for producing a suction, positioned exteriorly of said casing and portably joined thereto, and an outlet in said casing for the discharge therefrom of dust and debris to said suction device and therethrough to said collecting means.

6. A mechanical crack router comprising a motor; a crack cutter driven thereby; and means for removing to a suitable collecting means the debris loosened by the cutter, a casing encompassing said cutter, a device for producing a suction, positioned exteriorly of said casing and portably joined thereto, and an outlet in said casing for the discharge therefrom of dust and debris to said suction device and therethrough to said collecting means, said suction device consisting of a fan casing and an impeller driven by said motor.

7. A mechanical crack router comprising a motor, a crack cutter driven thereby, and means for removing to a suitable collecting means the debris loosened by the cutter, said removing means comprising a casing encompassing said cutter, a device for producing a suction positioned exteriorly of said casing, and an outlet in said casing for the discharge therefrom of dust and debris to said suction device and therethrough to said collecting means, said suction device consisting of a suction fan, comprising a casing and an impeller, driven by said motor, and said cutter casing being portably joined to said fan casing, said fan impeller being direct connected to said motor, and a speed reducing means interposed between the motor and the cutter, whereby the speed of said cutter is reduced with relation to said fan impeller.

8. A mechanical crack router comprising an electrically driven motor, a crack cutter driven thereby, geared speed reducing means between the motor and the cutter, a suction fan driven by said motor, one or more casings surrounding the motor, cutter, speed reducing means and fan, and a debris conducting duct extending from said casings and having thereon a means for connecting thereto a removable debris collecting means, said casings including a housing for said fan, a gear casing and a suction fan casing removably mounted on said housing, and said debris removing duct extending from said fan casing.

9. A mechanical crack router comprising a motor, a crack cutter driven thereby, and means for removing to a suitable collecting means the debris loosened by the cutter, said removing means comprising a casing, encompassing said cutter, a device for producing a suction, positioned exteriorly of said casing and portably joined thereto, and an outlet in said casing for the discharge therefrom of dust and debris to said suction device and therethrough to said collecting means, said suction device consisting of a suction fan comprising a casing and an impeller, driven by said motor, and said cutter casing being portably joined to said fan casing, said motor being enclosed by a housing, and said fan casing having thereon a part, removably clamped to said housing.

10. A mechanical crack router comprising a motor, a crack cutter driven thereby, and means for removing to a suitable collecting means the debris loosened by the cutter, said removing means comprising a casing, encompassing said cutter, a device for producing a suction, positioned exteriorly of said casing and portably joined thereto, and an outlet in said casing for the discharge therefrom of dust and debris to said suction device and therethrough to said collecting means, said suction device consisting of a suction fan, comprising a casing and an impeller, driven by said motor, and said cutter casing being portably joined to said fan casing, said motor being enclosed by a housing, and said fan casing having thereon a part, removably clamped to said housing, said housing having thereon a cylindrical flange and said part having thereon a split periphery, removably clamped to said flange, and means on said part or drawing towards each other the ends of said split periphery and keeping them drawn to each other, thereby removably clamping said periphery on to said flange.

11. A mechanical crack router comprising a motor, a crack cutter driven thereby, and means for removing to a suitable collecting means the debris loosened by the cutter, said removing means comprising a casing, encompassing said cutter, a device for producing a suction, positioned exteriorly of said casing and portably joined thereto, and an outlet in said casing for the discharge therefrom of dust and debris to said suction device and therethrough to said collecting means, said suction device consisting of a suction fan, comprising a casing and an impeller, driven by said motor, and said cutter casing being portably joined to said fan casing, a handle, universally-pivotally connected to a part on one of said casings and a means for detachably securing said handle thereto.

12. A mechanical crack router comprising a motor, a crack cutter driven thereby, and means for removing to a suitable collecting means the debris loosened by the cutter, said removing means comprising a casing, encompassing said cutter, a device for producing a suction, positioned exteriorly of said casing and portably joined thereto, and an outlet in said casing for the discharge therefrom of dust and debris to said suction device and therethrough to said collecting means, said suction device consisting of a suction fan, comprising a casing and an impeller, driven by said motor, and said cutter casing being portably joined to said fan casing, combined with a handle, universally-pivotally connected to a part on one of said casings and a means for detachably securing said handle thereto, said casing part having thereon a stem, combined with a split clamping ring, frictionally pivotally connected to a part on said handle and swivelled on said stem, and a means for tightening said ring on to said stem and handle part, whereby said handle is universally pivotally connected to said casing and detachably secured thereto.

13. A mechanical crack router comprising a motor, a crack cutter driven thereby, and means for removing to a suitable collecting means the debris loosened by the cutter, said removing means comprising a casing, encompassing said cutter, a device for producing a suction, positioned exteriorly of said casing and portably joined thereto, and an outlet in said casing for the discharge therefrom of dust and debris to said suction device and therethrough to said collecting means, said suction device consisting of a suction fan, comprising a casing and an impeller, driven by said motor, and said cutter casing being portably joined to said fan casing, said fan casing terminating in a duct for discharging therethrough dust and debris to said collecting means.

DANIEL F. McLAREN.